No. 878,920. PATENTED FEB. 11, 1908.
B. R. WILLIAMS.
HOE.
APPLICATION FILED APR. 29, 1907.
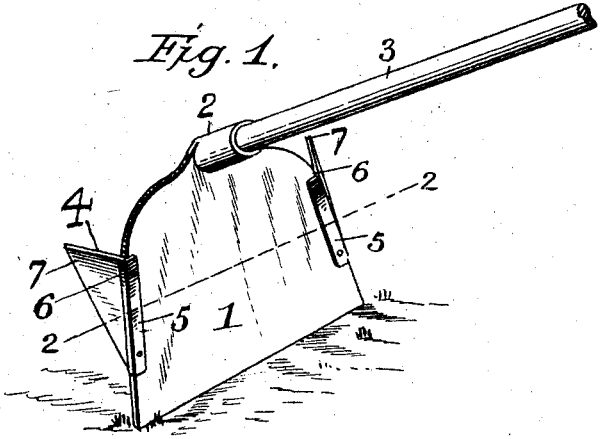
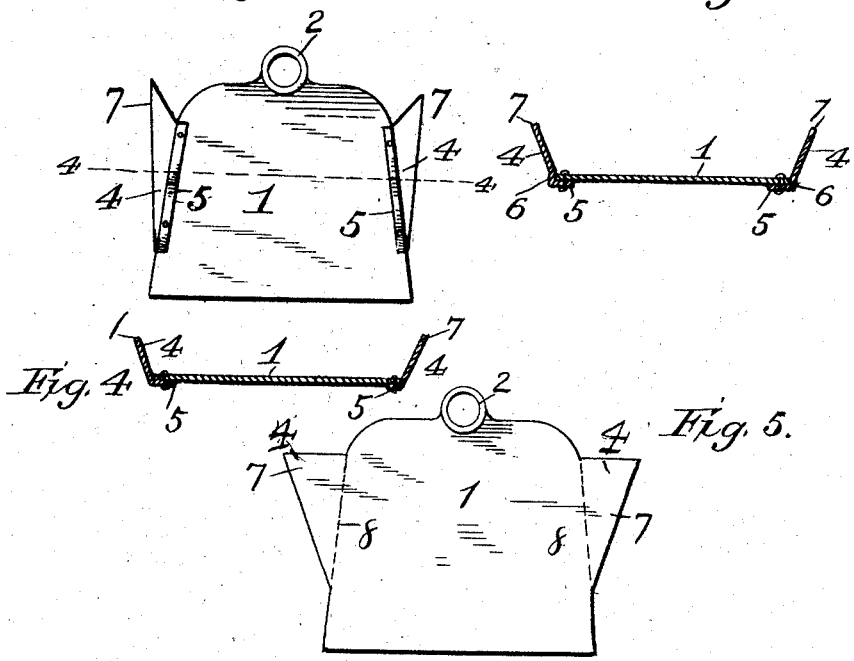

UNITED STATES PATENT OFFICE.

BENJAMIN R. WILLIAMS, OF ENGLISH, ARKANSAS.

HOE.

No. 878,920.  Specification of Letters Patent.  Patented Feb. 11, 1908.

Application filed April 29, 1907. Serial No. 370,893.

*To all whom it may concern:*

Be it known that I, BENJAMIN R. WILLIAMS, a citizen of the United States, residing at English, in the county of Jefferson and State of Arkansas, have invented certain new and useful Improvements in Hoes, of which the following is a specification.

My invention has relation to new and useful improvements in hoes, and consists in providing one or both of the side edges of a hoe blade with an auxiliary blade having a beveled cutting edge, said blades being of such construction as to enable the user to remove the weeds, grass etc., found in a piece of land, or growing crop, with greater facility and convenience than can be done through the use of an ordinary hoe.

With these ends in view my invention consists in the novel construction, combination and arrangement of parts as illustrated in the drawings and set forth in the specification and claims hereunto attached.

In the accompanying drawings, in which like parts are designated by like characters throughout the several views, Figure 1, is a perspective view of a hoe blade, having my auxiliary blades attached to both sides thereof. Fig. 2, is a cross sectional view of Fig. 1, on the line 2, 2. Fig. 3, is a face view of a modified form of my invention. Fig. 4, is a cross sectional view of Fig. 3, on the line 4, 4. Fig. 5, is a face view of the hoe blade, with the auxiliary blades integral with the blade and ready to be bent back.

In describing my invention I read the drawings from left to right.

My invention is described as follows:—

The numeral 1, represents the hoe blade; 2, the eye and 3, the handle.

My auxiliary blade 4, consists of a V shaped piece of metal, the straight edge 5, of which is secured to the front face and side edge of the hoe blade; it is then turned back for the thickness of said blade, at an angle of 90 degrees, forming a square shoulder 6; then it is turned out a little, at an angle of about 110 degrees, from the face of the hoe blade, forming a wing 7.

The purpose of the square shoulder 6, is that that part of the auxiliary blade may abut squarely against the square edge of the hoe, and thus relieve the strain from the rivets, or other means which hold said auxiliary blade to the hoe blade.

In my first modified form, I do away with the shoulder 6, and turn the wing 7, directly back, at an angle of about 110 degrees, from the face of the hoe blade.

In my second modified form, I cut the shape of the hoe and wing, or wings, all out of one piece, and turn the wings back at the dotted lines 8.

Although I have specifically described the combination, construction and arrangement of the several parts of my invention, I do not confine myself particularly to such specific combination, construction and arrangement, as I claim the right to make such changes and modification therein as may clearly fall within the scope of my invention, and which may be resorted to without departing from the spirit, or sacrificing any of my patentable rights therein.

Having described my invention, what I claim as new and desire to secure by Letters Patent, is:—

The combination with a hoe blade 1, of an auxiliary blade 4, having one edge secured to the side edge of the hoe blade and turned back at an obtuse angle to the face of the hoe blade, forming wings 7, substantially as shown and described and for the purposes set forth.

In testimony whereof I affix my signature in presence of two witnesses.

BENJAMIN R. WILLIAMS.

Witnesses:
JOHN W. RAMSEY,
EDMUND W. WILLIAMS.